(12) United States Patent
Vignolo et al.

(10) Patent No.: US 12,050,131 B2
(45) Date of Patent: Jul. 30, 2024

(54) ANALYSIS SYSTEM AND METHOD FOR EVALUATING AND PREDICTING A QUALITY OF A COATING

(71) Applicant: BASF Coatings GmbH, Münster (DE)

(72) Inventors: Carlos Vignolo, Wuerzburg (DE); Florian Steufmehl, Muenster (DE)

(73) Assignee: BASF COATINGS GMBH, Muenster (DE)

( * ) Notice: Subject to any disclaimer, the term of this patent is extended or adjusted under 35 U.S.C. 154(b) by 553 days.

(21) Appl. No.: 17/312,254

(22) PCT Filed: Dec. 12, 2019

(86) PCT No.: PCT/EP2019/084901
§ 371 (c)(1),
(2) Date: Jan. 20, 2022

(87) PCT Pub. No.: WO2020/120681
PCT Pub. Date: Jun. 18, 2020

(65) Prior Publication Data
US 2022/0146313 A1    May 12, 2022

(30) Foreign Application Priority Data
Dec. 14, 2018   (EP) ..................... 18212673

(51) Int. Cl.
*G01J 3/46* (2006.01)
*G01J 3/02* (2006.01)
*G01J 3/50* (2006.01)

(52) U.S. Cl.
CPC ............. *G01J 3/463* (2013.01); *G01J 3/0264* (2013.01); *G01J 3/50* (2013.01)

(58) Field of Classification Search
CPC ............. G01J 3/463; G01J 3/0264; G01J 3/50
See application file for complete search history.

(56) References Cited

U.S. PATENT DOCUMENTS

2012/0254141 A1*  10/2012  Poland ..................... B05D 5/06
                                                     707/705
2016/0005187 A1*  1/2016   Prakash ............. G01N 21/4738
                                                     356/402
(Continued)

FOREIGN PATENT DOCUMENTS

DE     102007004706 A1    8/2008
WO       2016074801 A2    5/2016

OTHER PUBLICATIONS

International Search Report for corresponding PCT/EP2019/084901 mailed Mar. 6, 2020, 3 Pages.

*Primary Examiner* — Tarifur R Chowdhury
*Assistant Examiner* — Akbar H. Rizvi
(74) *Attorney, Agent, or Firm* — Armstrong Teasdale LLP

(57) ABSTRACT

Described herein is an analytical system (100) for assessing and predicting a performance factor of at least one coating on at least one object with a multiplicity of subunits. The analytical system includes a sensor arrangement (103) with a multiplicity of sensors, an administrative unit (105) with at least one processor, and an output unit (107). The sensor arrangement is configured to subject the at least one object coated with at least one respective coating to colorimetric measurement by means of the multiplicity of sensors and to provide corresponding measurement data to the administrative unit. The administrative unit is configured to determine respective colorimetric deviations of the at least one coating relative to a corresponding color reference for a multiplicity of subunits of the at least one object, and to output these deviations on the output unit.

11 Claims, 7 Drawing Sheets

(56) References Cited

U.S. PATENT DOCUMENTS

2016/0123815 A1\* 5/2016 Steenhoek .............. G01J 3/504
 356/402
2017/0242570 A1\* 8/2017 Beymore ................ G01J 3/463
2017/0328774 A1 11/2017 Vignolo et al.

\* cited by examiner

ANALYSIS SYSTEM AND METHOD FOR EVALUATING AND PREDICTING A QUALITY OF A COATING

CROSS-REFERENCE TO RELATED APPLICATIONS

This application is a U.S. National Phase Application of International Patent Application No. PCT/EP2019/084901, filed Dec. 12, 2019, which claims priority to European Patent Application No. 18212673.0, filed Dec. 14, 2018, the entire contents of which are hereby incorporated by reference herein.

FIELD OF INVENTION

The present invention relates to an analytical system and a method for assessing and predicting a performance factor of at least one coating applied to at least one object with a multiplicity of subunits in a manufacturing plant for—for example—automobiles.

BACKGROUND

In the coating of objects, such as bodywork components and ancillary components of vehicles, in industrial plants, especially manufacturing plants, large volumes of data are determined for colorimetric properties of respective coatings applied to an object. These volumes of data have to date been amenable to interpretation by a user only if considerable time is expended.

Further, there is a need to optimize coatings in terms of their respective match to a respective mandated color reference when the coatings are applied to a respective object.

Against this background it is an objective of the present invention to provide an improved possibility for capturing and monitoring a performance factor of a coating applied or to be applied to an object, especially in a manufacturing plant, in a manner collateral with the manufacturing process (i.e., online).

The aforesaid objective is resolved by the respective subjects of the independent patent claims.

DESCRIPTION

Presented accordingly is an analytical system for assessing and for predicting a performance factor of at least one coating on at least one object with a multiplicity of subunits. The analytical system comprises a sensor arrangement with a multiplicity of sensors, an administrative unit with at least one processor, and an output unit.

The sensor arrangement is configured to subject the at least one object coated with at least one coating to colorimetric measurement by means of the multiplicity of sensors and to provide corresponding measurement data or measurement values.

The administrative unit is configured, on the basis of the measurement data provided or to be provided by the sensor arrangement, to determine colorimetric deviations of the at least one coating relative to a corresponding color reference for the multiplicity of subunits of the at least one object and to output these data, sorted by means of at least one filter function, on the output unit in real time, in compressed form, using at least one coefficient assigned to the respective colorimetric deviations of the at least one coating. The respective colorimetric deviations here may be output alternatively as raw data, i.e., unprocessed, and/or having undergone further calculation, in the form of at least one color performance indicator, the outputting thus being displayed, for example, on a display unit, such as a display panel, for example.

The administrative unit is additionally configured to select the at least one filter function in dependence on a variable of the at least one coefficient, with the at least one filter function being designed to output the measurement data and/or the colorimetric deviations in a form compressed quantitively by means of at least one mathematical operation. For this purpose, the filter function is able to pool the measurement data and/or the colorimetric deviations by means of a mathematical operation, such as, for example, a band pass filter, a transformation or any other mathematical operation, and/or to select individual values or value ranges from a total value range of the measurement data and/or of the colorimetric deviations.

The administrative unit is additionally configured a), on the basis of the colorimetric deviations of the at least one coating relative to the corresponding color reference, for the multiplicity of subunits of the at least one object, to drive a coating unit in such a way that said unit applies the at least one coating to the at least one object in such a way that colorimetric deviations of the at least one coating relative to the corresponding color reference for the multiplicity of subunits of the at least one object are minimal, and to adjust the coating unit dynamically in dependence on the at least one coefficient, and/or b), on the basis of the colorimetric deviations of the at least one coating relative to the corresponding color reference, to drive a mixing unit in such a way that said unit provides a coating whose colorimetric deviations relative to the corresponding color reference for the multiplicity of subunits of the at least one object are minimal, and to adjust the mixing unit dynamically as a function of the at least one coefficient.

A color reference in the context of the present invention refers to a shade original.

In order to control at least one coating unit for applying a coating to an object and/or a mixing unit to provide and/or mix a coating, the administrative unit may be connected via an interface, such as a wireless interface, a tethered interface or a computer network, for example, to the at least one coating unit and/or the mixing unit. The mixing unit and/or the coating unit may in each case be comprised by the analytical system, i.e. may be respective components of the analytical system or may be designed as respective components of the analytical system.

Correspondingly, the administrative unit may adjust the mixing unit by transferring operating parameters for the mixing of the coating from the administrative unit to the mixing unit, with a feature of the coating being that colorimetric deviations of the coating relative to the corresponding color reference are minimal. The operating parameters by way of example may comprise "mixing fractions of parent substances of the coating" and/or "stirring times" or "resting times". The mixing unit adjusts the operating parameters, mixes the coating, and provides it, subject to these conditions.

To adjust the coating unit, the administrative coating may transmit to the coating unit operating parameters, such as, for example, a value for a coating to be used, a pressure, an application angle, or a spraying robot to be used, by which the coating is to be applied to an object. The coating unit drives its components, such as the respective spraying robot to be used, for example, in accordance with the operating parameters, and coats the object subject to these conditions.

To determine the respective colorimetric deviations of the at least one coating, first of all, colorimetric coordinates of the color reference and colorimetric coordinates of the at least one coating are determined, for the multiplicity of subunits coated with the coating, with one spectrophotometer each, for a number of measurement geometries and a number of light sources. On the basis of these determinations, for each measurement geometry of the number of measurement geometries and for each light source of the number of light sources, respective color differences are calculated from the colorimetric coordinates of the color reference and the respective colorimetric coordinates of the coating, for the multiplicity of subunits coated with the coating. The respective colorimetric coordinates are standardized with one weighting factor each.

The respective colorimetric deviations are ascertained in particular on the basis of the respective color differences and/or sparkle differences and/or coarseness differences determined or calculated in these ways. This means that the respective colorimetric deviations can be shown or represented directly by the respective color differences or by at least one of a plurality of color performance indicators. Each of the plurality of color performance indicators is ascertained by means of a mapping, defined by a mandated mapping protocol, of functional values, calculated for the number of measurement geometries and the number of light sources in each case by means of a mathematical correlation, specific to the respective color performance indicator, between color differences of at least one of the subunits (relative to the color reference), to a value on a mandated scale. It is also conceivable for sparkle differences and coarseness differences relative to the color reference, as well as the color differences, to be taken into account.

Refinements are apparent from the description and appended drawings.

A performance factor of a coating in the context of the present invention is a match or deviation of colorimetric properties of the coating relative to a corresponding color reference, especially after application to an object.

Colorimetric properties in the context of the present invention are physical manifestations of a coating that can be represented, for example, using color coordinates of a color space, especially an Lab color space, an LhC color space, a statement of a sparkle effect coefficient and/or of a coarseness value.

An object in the context of the present invention is an object to be coated with a coating, such as a vehicle, for example.

In particular, an object has a plurality of subunits, i.e., subregions which are separated geometrically, such as, for example, a left fender, a right fender, a hood and/or a bumper.

A color reference in the context of the presented invention is a shade original having specified and known colorimetric properties. A color reference may be applied, for example, on a reference object (master panel) and represented virtually, for example, as a point in a color space.

Output in real time in the context of the present invention is an outputting of results which is output directly, i.e., in a time range of less than one minute, preferably less than 30 seconds, more preferably less than 10 seconds, very preferably less than 1 second, starting from a measurement time for capturing the measurement data required in order to calculate the performance factor of the coating, the outputting taking place on an output unit.

A coefficient in the context of the present invention is a statistic which serves to quantify the colorimetric properties of a coating. The coefficient is based on a protocol for the quantitative, reproducible measurement of the colorimetric properties of the coating in relation to a performance criterion. The coefficient condenses factual information and causal relationships about the colorimetric properties of the coating by means of an absolute number; on the basis of the coefficient, it is possible to deliver an assessment of the performance of the coating in relation to the performance criterion, to produce rankings in the case of a plurality of investigated coatings, and, ultimately, to make a decision with regard to a coating ultimately to be selected in relation to the performance criterion. More particularly, a coefficient is a statistic or quantitative indication of a performance factor, as for example a match of the coating with colorimetric properties of the color reference, in relation to the performance criterion. Where different criteria or performance criteria are considered, a corresponding plurality of coefficients assigned to the respective performance criteria will have to be provided and ascertained.

A compressed outputting of measurement values or measurement data, or of colorimetric deviations relative to a color reference, in the context of the present invention is a mathematically fused outputting of a multiplicity of measurement values by means, for example, of an at least smaller number of coefficients, or a selection of measurement value or measurement data and/or of colorimetric deviations relative to a color reference from the multiplicity of measurement data or measurement values determined and/or from colorimetric deviations relative to the color reference. This means that, for example, a part of the measurement data or measurement values, and/or a part of the colorimetric deviations relative to the color reference, is selected and processed or filtered by means of a filter function and compressed subject to these conditions. As a result of the compression, respective measurement data or measurement values and/or the colorimetric deviations relative to the color reference are compressed particularly in such a way that they can be captured by a person.

An object in the context of the presented invention comprises at least one surface element. A surface element in the context of the present disclosure denotes not an individual coated surface, but rather a group of identical or similar surfaces coated with the coating. Accordingly, for example, surfaces—coated with the coating—of parts of a product, especially of bodywork parts of a vehicle body, are to be subsumed under a first surface element, and surfaces—coated with the coating—of ancillary parts for the product, especially of bodywork ancillary parts of a particular type, such as a bumper, for example, are to be subsumed under a second surface element. In the text below, parts of a product, especially bodywork parts of a vehicle body, and/or a surface element representing the surfaces thereof, are denoted by OEM, and a surface element representing ancillary parts for the product, especially ancillary bodywork parts of a particular type, are denoted by ASP.

As explained above, it is possible on the basis of the measurement values or the measurement data, to ascertain various color performance indicators, with each color performance indicator for a respective coating being represented by or assigned to a respective coefficient. Correspondingly, in the case of compressed outputting, different measurement values are associated with one another by means of a respective mathematical operation specific to a color performance indicator and are each assigned to a respective coefficient which represents the respective color performance indicator of the coating.

The respective value of the coefficient here may correspond to a value on a mandated scale. The mandated scale is identical for all color performance indicators and extends over integral numerical values from 1 to 8 or Q1 to Q8, where 1 or Q1 represents a worst grading and 8 or Q8, correspondingly, represents a best grading of the coating in relation to a performance criterion of the coating that is characteristic for a respective color performance indicator. Alternatively to this it is also possible for each color performance indicator to have a specific scale assigned, or to be assigned a specific scale, for the respective color performance indicator. The mandated mapping protocol is identical at least for a subgroup of the plurality of color performance indicators and is therefore overarching with respect to color performance indicators, with the subgroup embracing more than one color performance indicator.

Since the various subranges or subunits of the object interact differently with a coating applied to the object and therefore to the respective subunits, the colorimetric properties of the coating are influenced differently by the respective subranges or subunits. Accordingly, the coating generally exhibits different colorimetric properties on different subranges or subunits. By way of example, a colorimetric property of the coating may be influenced by a geometrical characteristic of a respective subregion, particularly by its surface structure.

By means of the analytical system presented it is possible to determine the colorimetric properties of a coating for each subunit of an object, on the basis of colorimetric deviations relative to a color reference, expressed, for example, in the form of the calculated, different color performance indicators, and thereby to output these properties, in a manner in which they can be captured intuitively, on an output unit. By means of a comparative representation of the colorimetric properties of a coating for a multiplicity of subranges or subunits of an object on an output unit, a difference arising, for example, from a geometrical design of a subunit and affecting the colorimetric properties of the coating relative to a color reference and/or relative to a further subunit can be quickly and intuitively recognized. As soon as such a difference has been recognized and, possibly, lies above a mandated threshold value, this difference can be corrected by suitable countermeasures, such as by recoating, for example, and possibly avoided in further coating procedures.

In one possible refinement of the analytical system presented, respective sensors of the multiplicity of sensors are divided into a plurality of sensor groups, and respective sensor groups are assigned to respective subunits of the at least one object.

A division of respective sensors into sensor groups has the technical effect that measurement values determined by corresponding sensors can be assigned particularly easily and unambiguously to corresponding subunits of the object.

Furthermore, measurement values which have been determined by sensors of one sensor group can be particularly efficiently and unambiguously filtered, i.e., distinguished from measurement values of other sensors. Correspondingly, by a selection of a suitable sensor group which, by way of example, shows exclusively measurement values which originate from a respective subunit, it is possible to minimize an edge effect at which adjacent subunits interact with the respective subunit.

In a further possible refinement of the analytical system presented, the administrative unit is configured to output, on the output unit, respective colorimetric deviations of a multiplicity of subunits for a multiplicity of objects, sorted in dependence on at least one mandated filter setting.

The technical effect of a filter setting, which can be mandated by a user, for example, is to process or to sort a set of data in such a way that only data relevant to a particular query assigned to the filter setting, or respective data sorted according to relevance, are represented. Accordingly, respective data of particular relevance can be identified quickly and easily.

For example it is possible, using the analytical system presented, by activation of a respective filter setting, to have all colorimetric deviations of an applied coating relative to a color reference, for a front left fender of various vehicles on a production line, selectively output or prominently output.

In a further example it is possible, using the analytical system presented, by activation of a respective filter setting, to have all colorimetric deviations of an applied coating relative to a color reference, for a front left fender and a front right fender of a specific vehicle or of a specific type of vehicle on a production line output selectively or output prominently, i.e., with labeling.

In a refinement of the analytical system presented, provision may be made for different preset filter settings to be displayed as tabs of a display logic, particularly of a display menu or menu bar, and to be capable of being activated, for example, by touch and/or by clicking by means of a cursor. This means that when a tab is activated, respective measurement values determined and/or colorimetric deviations ascertained from these values relative to a color reference are manipulated with a filter setting assigned to the tab and, sorted accordingly, are output on the output unit.

In another possible refinement of the analytical system presented, the administrative unit is configured to output a warning message on the output unit in the event that a respective colorimetric deviation of a respective subunit of a respective object lies above a mandated threshold value.

The technical effect of a warning message is that a critical colorimetric deviation, i.e., the case where a respective colorimetric deviation of a respective subunit of a respective object lies above a mandated threshold value, can be displayed in such a way that it is rapidly capturable for a user or another system, and to enable appropriate countermeasures.

In another possible refinement of the analytical system, the administrative unit is configured to show at least one colorimetric deviation for at least one subunit of an object together with a corresponding measurement variance for each of the measurement values on which the colorimetric deviation is based.

The representation of a measurement variance has the technical effect that a respective measurement value can be considered and evaluated quickly and easily in relation to the other measurement values. Accordingly, for example, an outlier or a measurement error can be detected if a measurement value, for example, is greater than three times an average measurement variance.

In one example, the corresponding measurement variance can be shown as process variability in at least one box plot. A "box plot" is able to show process variability in a manufacturing plant or on a production line in a way which can be captured intuitively. For example, respective vehicles which have been coated with a coating of one batch can be shown together in a box plot, so that respective individual vehicles are compared particularly quickly with other vehicles, likewise coated with a coating of the same batch, to determine whether, for example, the respective vehicle lies within a mean variance of all the vehicles coated with a coating of the same batch.

A series or a serial production of surfaces coated with a coating of one batch encompasses all the surfaces of a respective surface element that are coated with the coating of one batch within a continuous coating operation. A surface element in the context of the present disclosure discloses not an individual coated surface but rather a group of identical or similar surfaces coated with the coating. Accordingly, for example, a first surface element subsumes surfaces of parts of a product that are coated with the coating, especially surfaces of bodywork parts of a vehicle body, and a second surface element subsumes surfaces of ancillary parts for the product that are coated with the coating, especially ancillary bodywork parts of a particular type, such as a bumper, for example. In the text below, parts of a product, especially bodywork parts of a vehicle body, or a surface element representing the surfaces thereof, are referred to by OEM, and a surface element representing ancillary parts for the product, especially ancillary bodywork parts of a particular type, is referred to by ASP.

A batch is one supply of the coating with a prescribed batch tolerance.

In another possible refinement of the analytical system presented, the administrative unit is configured to output a respective colorimetric deviation, separated according to color coordinates or color dimensions of a color space, on the output unit.

A representation of colorimetric deviations separated according to color coordinates, such as, in the Lab space, for example, a lightness coordinate (L*), a green-red coordinate (a*) or a blue-yellow coordinate (b*), offers the advantage that individual coordinate manifestations can be looked at, evaluated, and compared quickly for the colorimetric deviations for at least one coating and/or objects or subunits coated with the at least one coating.

In a further possible refinement of the analytical system presented, the administrative unit is configured to assign respective colorimetric deviations of the at least one coating, in the form of at least one above-described color performance indicator of a plurality of color performance indicators, to a coefficient for the at least one color performance indicator, by means of a mandated respective color-performance-indicator-specific allocation scheme, and to output the respective colorimetric deviations on the output unit, using at least the coefficient for the at least one color performance indicator.

As already explained above, the coefficient for a respective color performance indicator represents a qualitative performance criterion for the coating on the basis of at least one measurement value and/or at least one colorimetric deviation. Coefficients or values of coefficients for a respective color performance indicator of different coatings on identical part-units of an object and/or coefficients for a respective color performance indicator of the same coatings on different part-units or subunits of the object can be compared with one another. Accordingly, using a respective coefficient, it is possible for a set of measurement values to be rapidly filtered in a way that takes account of multiple and/or different factors, or for a set of measurement values to be assessed multifactorially correspondingly. In particular, a set of measurement values or measurement data can be sorted, for example, according to descending magnitude of a respective coefficient, or the measurement values in a set of measurement values that are displayed may be only those which are assigned to a coefficient equal to or greater than a mandated threshold value.

In another possible refinement of the analytical system presented, the administrative unit is configured to calculate and display on the output unit an anticipated performance factor of a coating which is formulated on the basis of the reference coating and is to be applied to a respective object, using respective colorimetric deviations of respective subunits of at least one object that are coated with a reference coating, relative to the color reference.

Whereas a color reference is a mandated reference object (master panel) with mandated colorimetric properties, colorimetric properties of an object coated with a reference coating may differ from the colorimetric properties of the color reference, owing, for example, to irregularities during the application of the reference coating to the object.

Through the calculation of an anticipated performance factor of a coating, i.e., by ascertainment of a forecast by means, for example, of a correlation analysis of respective colorimetric properties of a coating under assessment, with respective colorimetric properties of a reference coating that has already been measured, it is possible for the coating under assessment to be optimized in a targeted way, where appropriate, even before a coating of respective objects or of respective subunits of a respective object, in order, for example to correct weaknesses in the reference coating measured.

Through a dynamic setting of a mixing unit for mixing a coating, it is possible to adapt a coating to be used in a manufacturing plant dynamically to current circumstances, such as to current component geometries or current ambient conditions, for example, using the analytical system presented and/or the method presented, in order, for example, to obtain a minimal colorimetric deviation relative to a color reference.

The presented invention relates further to a coating determination unit for providing a coating. The coating determination unit comprises an administrative unit with at least one processor and an output unit. The administrative unit is configured to determine colorimetric deviations of a reference coating on respective subunits of at least one object relative to a color reference, to calculate the determined colorimetric deviations with colorimetric deviations of a candidate coating relative to the reference coating, where the colorimetric deviations of the candidate coating relative to the reference coating are ascertained as a deviation factor, the calculation being made in particular by means of a mathematical method, such as, for example, by addition or multiplication, in order to predict colorimetric deviations of the candidate coating relative to the color reference.

The administrative unit is further configured to modify a formula of the candidate coating virtually to give a final coating until respective predicted colorimetric deviations of the candidate coating or of the then final coating relative to the color reference lie below a mandated threshold value. Furthermore, the administrative unit, in a further refinement, is configured to transmit a coating formula of the final coating to a mixing unit for producing the final coating.

A candidate coating may be, for example, a mandated coating with which an object is to be coated.

In particular, the at least one coefficient comprises at least one value of a plurality of color performance indicators. Each of the plurality of color performance indicators is determined by means of a mapping, defined by a mandated mapping protocol which is identical for the color performance indicators, of functional values calculated for a number of measurement geometries and a number of light sources, in each case by means of a mathematical correlation between the colorimetric deviations from at least one of the surface elements (relative to the color reference), this correlation being specific to the respective color performance indicator, onto a value of a mandated scale. This means that by virtue of the at least one coefficient, a multiplicity of measurement values is compressed into a respective value of a respective coefficient or of a respective color performance indicator.

In order to modify the candidate coating, in other words to modify a composition of coating components which form the candidate coating, the administrative unit is able to carry out virtual modification of respective coating components and/or of a quantitative fraction of respective coating components forming the candidate coating, so that anticipated colorimetric properties and, consequently, the anticipated at least one coefficient, provided in accordance with the invention, of the candidate coating, are modified accordingly.

In another possible refinement of the coating determination unit presented, the administrative unit is configured to optimize the candidate coating by correcting the candidate coating using a predicted deviation between the candidate coating and the reference coating. This means that, using the deviation determined, the formula or the technique of applying the candidate coating, for example, is modified such that following application by the coating system, the deviation is or becomes minimal. For example, the coating can be corrected by a modified formula, in which respective components are replaced by alternative components or in which an alternative weighting is used when producing the coating.

The presented invention relates further to a method for assessing and predicting a performance factor of at least one coating on at least one object with a multiplicity of subunits, by subjecting at least one object coated with the at least one coating to colorimetric measurement by means of a sensor arrangement of the analytical system presented, and providing corresponding measurement data to the administrative unit.

Furthermore, by means of the administrative unit, respective colorimetric deviations of the at least one coating relative to a color reference are assigned at least one coefficient, using a mandated assignment scheme, and the measurement data are output in compressed form, using the at least one coefficient and at least one filter function, where the at least one filter function is selected in dependence on a magnitude of the at least one coefficient, and where the at least one filter function is configured to represent the measurement data and/or the colorimetric deviations in a form compressed quantitatively by means of at least one mathematical operation.

Furthermore, the administrative unit is used:

a) on the basis of the respective colorimetric deviations of the at least one coating relative to the color reference, for a multiplicity of subunits of the at least one object, to drive a coating unit in such a way that said unit applies a coating to the at least one object, the colorimetric deviations of said coating relative to the color reference for the multiplicity of subunits of the at least one object being minimal, and to adjust the coating unit dynamically in dependence on the at least one coefficient, and/or b) on the basis of the respective colorimetric deviations of the at least one coating relative to the color reference, to drive a mixing unit in such a way that said unit provides a coating whose colorimetric deviations relative to the color reference for the multiplicity of subunits of the at least one object are minimal, and to adjust the mixing unit dynamically as a function of the at least one coefficient.

The analytical system presented serves in particular for implementing the method presented.

The presented invention further relates to a computer program with program code means for controlling the analytical system, which, on execution by a processor unit, is designed to carry out method steps of the method presented.

The presented invention further relates to a computer-readable medium on which the presented computer program is stored.

Further advantages and refinements of the invention will become apparent from the description and the appended drawings.

It will be appreciated that the features stated above and those still to be elucidated hereinafter can be used not only in the particular combination specified but also in other combinations, or on their own, without departing the boundaries of the present invention.

The invention is represented schematically in the drawings, by exemplary embodiments, and is described in detail below, with reference to the drawings.

Figure 1:
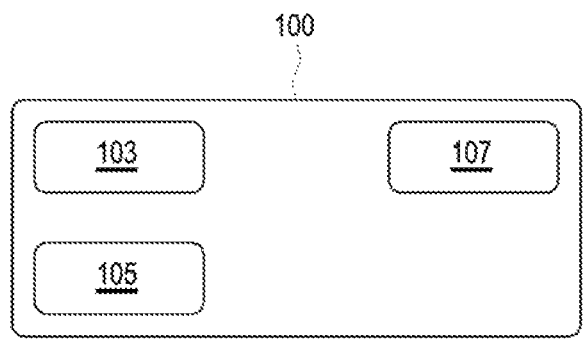
FIG. 1 shows a schematic representation of a possible refinement of the analytical system of the invention.

Represented in FIG. 1 is an analytical system 100. The analytical system 100 comprises a sensor arrangement 103, an administrative unit 105, and an output unit 107.

The purpose of the sensor arrangement 103 is to capture colorimetric properties of at least one coating. This means that the sensor arrangement 103 measures values for a particular coating, especially color measurement values in a color space, and/or at least one sparkle effect value, and/or at least one value of a coarseness, and assigns these values to the respective coating.

The sensor arrangement 103 may comprise a multiplicity of sensors, which are respectively assigned alone or in groups, for example, exclusively to respective subunits of a respective object coated with the coating, and is able, correspondingly, to determine only measurement values of the respective subunit coated with the coating.

The sensor arrangement 103 may have an at least partially movable configuration, so as to be able to realize different lighting and/or measurement geometries, in other words to be able to set different lighting angles and/or measurement angles or viewing angles.

The administrative unit 105 comprises at least one processor and is used for processing measurement values determined by the sensor arrangement 103 and for generating an output which is to be output on the output unit 107.

In particular, the administrative unit 105 is configured to determine respective colorimetric deviations of a coating relative to a corresponding mandated color reference, for a multiplicity of subunits of an object, and to output these deviations at least partly on the output unit 107.

Furthermore, the administrative unit 105 may be in communication with a further system, such as, for example, a mixing unit for mixing a coating and/or a coating unit for applying a coating to an object, in order to control the further system in dependence on colorimetric deviations and/or performance criteria currently determined by the administrative unit 105.

The purpose of the analytical system 100 is in particular to determine colorimetric properties of a coating on an object, such as a vehicle, for example, at the premises of a manufacturer of the object, such as, for example, in a manufacturing plant, and for adapting production conditions of the coating and/or of the object in real time, i.e., during ongoing manufacture. For this purpose, measurement values determined from a respective coated object, from its colorimetric properties, are compared for a multiplicity of subunits, such as a fender and/or a spoiler, for example, with a color reference, and are evaluated in particular with respect to a performance criterion, represented, for example, by one of a plurality of color performance indicators. Furthermore, on the basis of the comparison or on the basis of the evaluation, a forecast can be produced for a coating to be applied in the future to the object, and the coating can optionally be amended preventively, especially virtually, in order to ensure minimal colorimetric deviation of the coating ultimately produced and applied, relative to the color reference, on as many subunits as possible. Using a coefficient for, for example, at least one color performance indicator, it is possible to produce an output which can be easily captured and interpreted by a human user. In other words, the analytical system presented compresses measurement values and colorimetric deviations relative to a color reference, by means of at least one coefficient, and produces an output which can be used by a user, on an output unit, such as a display panel of the analytical system, for example, allowing the user actually to perceive the measurement values and/or the colorimetric deviations determined from them in it, and to analyze and process these values/deviations in a complete way.

The display panel may be implemented in the form of a graphical user interface (GUI), allowing the user to exert direct influence, via a menu bar with predefined tabs, for example, on the subject of the display.

By means of the analytical system 100 presented, the data structures on which the respective measurement values are based are changed in such a way that they lead to an output compressed relative to the raw data. For example, arrays can be made smaller or collapsed. In particular, for example, a plurality of arrays filled with measurement values can be transposed into one array or a few arrays, in order to allow particularly rapid calculation or viewing and/or to unify data structures.

The analytical system 100 presented allows a user or a third-party system to identify respective subunits of an object that are particularly critical in colorimetric terms and to subject them, where appropriate to optimized coating. For this purpose, for example, a coating which is particularly suitable for the critical subunits, i.e. a coating which has been optimized in relation to the color reference, can be selected, or a coating unit can be adapted to the critical subunits in a particular way, as for example by particularly thick application of films of the coating. Such adaptation of the coating and/or of the coating unit may take place in particular in real time and completely automatically, on the basis of current measurement values of a respective manufacturing plant.

Figure 2:
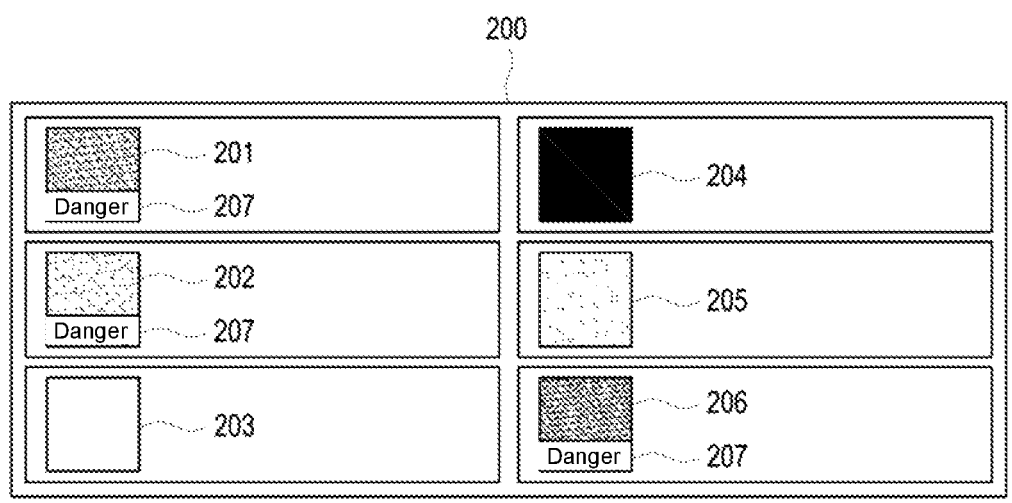
FIG. 2 shows a possible refinement of a first output on an output unit, generated by means of one embodiment of the analytical system of the invention.

In FIG. 2, on an output screen 200, which is designed as a dashboard or graphical user interface (GUI for short) and is part of the output unit 107, various coating symbols 201 to 206 are shown, which are assigned to respective subunits of an object, in the present case a vehicle body and/or a bumper of the vehicle.

A first coating symbol 201 is assigned here to the vehicle body subunit or "Body". The coating symbol 201 further shows a warning "Danger" 207. The warning 207 is output by the administrative unit 105 when a coating assigned to the coating symbol 201, in the case of a comparison of measurement values determined by the sensor arrangement 103 for the coating and for a color reference, has shown a deviation which is greater than a mandated or dynamically determined threshold value. In this case the threshold value may be determined, for example, in dependence on a variance of measurement values of the coating on the "Body" subunit or on a variance of measurement values of a complete series or a plurality of "Body" subunits.

Like the coating symbol 201, coating symbols 202 and 206 also show a warning "Danger" 207, because the respective coatings assigned to the coating symbols 202 and 206, in the case of a comparison of measurement values, determined by the sensor arrangement 103, for the respective coating and for a color reference have also produced a deviation which is greater than a corresponding threshold value.

Figure 3:
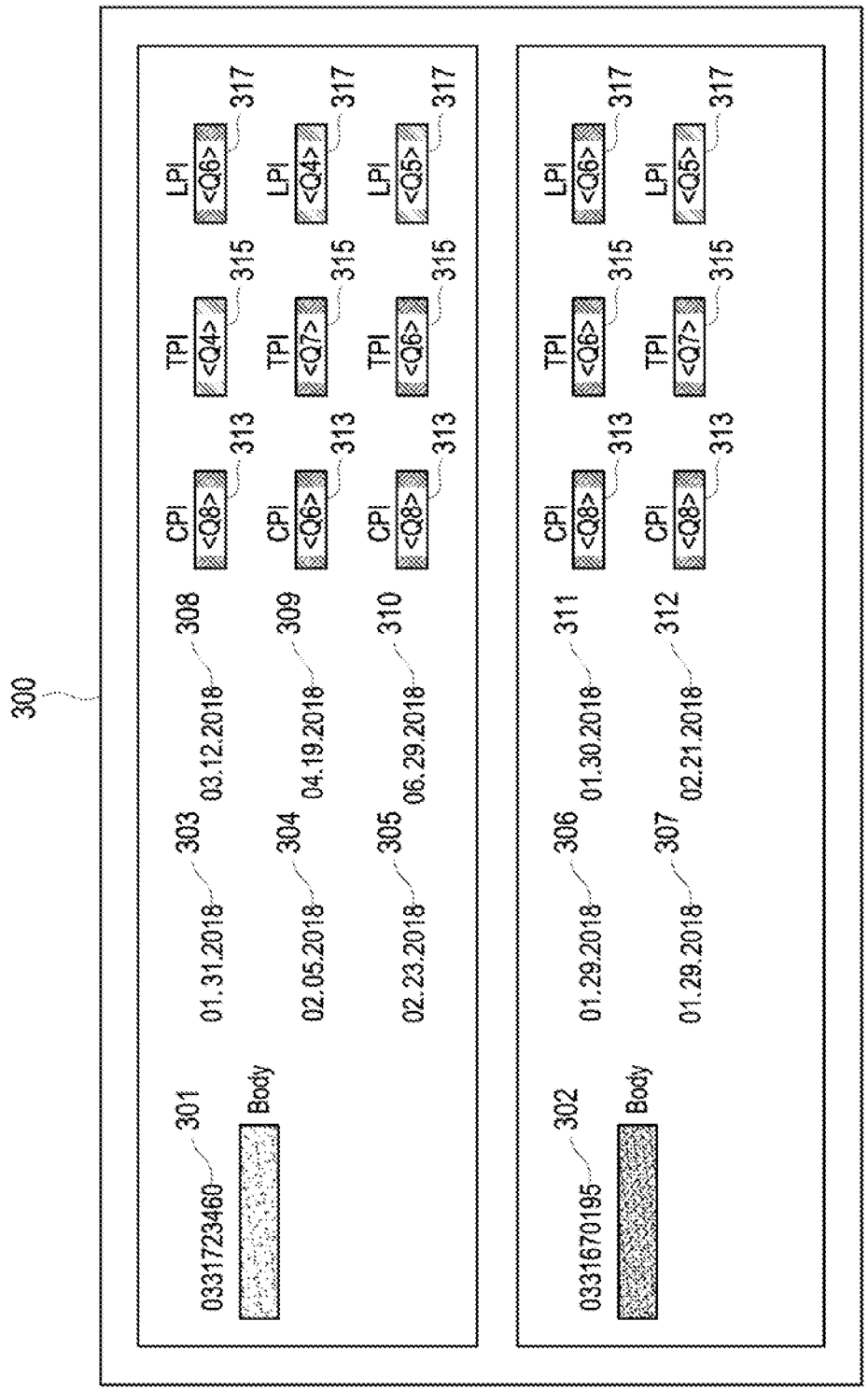
FIG. 3 shows a possible refinement of a second output on an output unit, generated by means of the embodiment of the analytical system of the invention.

Represented in FIG. 3 on an output screen 300, which is designed as a dashboard and is part of the output unit 107, are different coating numbers 301 and 302 with corresponding coefficients for different color indicators; the respective coating assigned to the respective coating numbers 301 and 302 has been applied at different times 303 to 307 to a "Body" subunit, i.e., to a vehicle body, and measured at different times 308 to 312. A first coefficient 313 here indicates a colorimetric deviation of a respective coating applied on the subunit, relative to a color reference, as series color performance indicator "CPI". A second coefficient 315 here indicates a colorimetric deviation of a respective coating relative to a color reference, as color performance indicator "TPI". A third coefficient 317 here indicates a colorimetric deviation of a respective coating relative to a color reference, as color performance indicator "LPI".

Here, the color performance indicator CPI (general color performance indicator), as a mathematical operation of the filter function implemented in accordance with the invention by the administration unit, is functionally associated with a number of or a percentage fraction of respective surfaces of a subunit of an object, in this case the vehicle body of the vehicle, comprising the surfaces coated with the coating of one batch on the subunit from one series, i.e., one production operation of one producer, whose respective color differences relative to the color reference are in each case greater than a tolerance value Ss or do not lie within the tolerance range dictated by the tolerance value Ss.

It is conceivable for the number of surfaces thus counted and/or their fraction as a percentage of the total number of surfaces from the series that are coated with the coating of the batch to be assigned, in accordance with a mandated mapping, to a value on a scale, with the scale value indicating the value of the series color performance indicator CPI. The scale value in this case is in a range from 1 to 8 or Q1 to Q8, where the scale value 1 (or Q1) represents a poorest rating and the scale value 8 (or Q8) represents a best rating.

The color performance indicator LPI (line performance indicator) is ascertained on the basis of a variance or as a variance of rectified and normalized color differences of at least one subunit, i.e., for example, of at least one surface element OEM of a vehicle body, coated for example by a body maker, and/or of at least one surface element ASP of an ancillary body component, coated for example by a vehicle components supplier and produced in particular from plastic, for each measurement geometry and each light source. In this procedure, respective values resulting from the number of measurement geometries and number of light sources are calculated with one another separately in turn for each subunit, and the respective result arising for each subunit is assigned separately, by means of the mapping protocol to be provided in advance, to a value on the scale, which is identical for all color performance indicators. The color performance indicator LPI is in this case produced as follows:

$$LPI_{OEM,ASP} = \text{rating}[f(\sigma_{<dX>_{WLPI(OEM,ASP,purged)}})] \quad (14)$$

where $\sigma_{<dX>}$ indicates the variance, WLPI represents the normalization factor with which the respective color differences and/or the respective colorimetric constants are to be normalized. In this case the colorimetric constants $L^*$, $a^*$, $b^*$, $C^*$, $H^*$ are weighted as follows in each case: $L^*$ with 1.0, $a^*$ with 0.2, $b^*$ with 0.2, $C^*$ with 0.8, $H^*$ with 0.2. These respective weighting constants are mandated for the measurement geometries and/or the spectral geometries.

OEM generally stands for "Original Equipment Manufacturer", but is used here in particular to identify a surface element of a product that is coated with the coating by the OEM, more particularly a surface element of a vehicle body ("Body") that is coated for example by the body maker; here, as explained earlier, the surfaces in question are all surfaces of product parts that are coated with the coating, especially those of body parts of a vehicle body, which are subjected to measurement.

ASP generally stands for "Automotive Supplier Plastics", but is used here in particular to identify an ancillary product component coated with the coating, more particularly an ancillary bodywork component coated with the coating, produced in particular from plastic by, for example, a vehicle components supplier; here again, the surfaces in question are all those surfaces of ancillary product parts that are coated with the coating, especially ancillary body parts of a particular type and/or of a particular origin, such as from a particular vehicle components supplier, for example. The component in question may for example be a bumper, a spoiler, etc.

QC here stands for "Quality Control".

The color performance indicator LPI represents an operating variance in the coating of a subunit of an object on a line or in a series, i.e., for example, an ancillary bodywork component or a vehicle body. Different color performance indicators LPI are calculated independently and separately from one another for the various subunits; in other words, for example, there is a color performance indicator $LPI_{OEM}$ for the surface of the "vehicle body" subunit and a respective color performance indicator $LPI_{ASP}$ for the surface of the respective "ancillary body component" subunit.

The color performance indicator TPI (tinting performance indicator) is produced as follows:

$$TPI_{OEM,ASP} = \text{rating}[f(\text{averaged}<dX>_{SC(OEM,ASP,purged)})] \quad (15)$$

where $<dX>=dX^*/S_x$ and where averaged $<dX>_{SC(OEM,ASP,purged)}$ corresponds to the mean value of the color differences, normalized with the normalization factor SC (=batch tolerance) and rectified, of a surface element OEM of a vehicle body, coated for example by a body maker, or, respectively, of a surface element ASP of an ancillary body component (of plastic), coated for example by a vehicle components supplier. The normalization factor SC here corresponds to a respective batch tolerance of the particular batch of the coating being investigated. For each batch, therefore, there is a color performance indicator TPI for the surface element OEM coated with the coating of the respective batch, and a color performance indicator TPI for the surface element ASP coated with the coating of the respective batch. In this context, for the surface element OEM coated with the coating of the batch, there are in general a plurality of identical surfaces measured that are represented by the surface element.

Presently, the second quality coefficient 315 of the color performance indicator TPI of the coating number 301, measured at the time 308 by the administrative unit 107, is colored yellow, or shown in the figure by means of light-colored shading, since the coefficient 315 of the coating number 301, measured at the time 308, has acquired a value "Q4" which is below a mandated threshold value of, for example, "Q5". Correspondingly, a user is able to quickly and intuitively capture the low value of the coefficient 315 of the coating number 301, measured at the time 308, and, where appropriate, to initiate countermeasures, such as recoating, for example. Analogous considerations apply to the coefficients 317 of the coating number 301 measured at the times 309 and 310, and also the coefficient 317 of the coating number 302 measured at the time 312, which are likewise emphasized by color or shown in the figure by a light-colored shading, i.e., provided with a warning. All other coefficients are colored green or shown in the figure by a light-colored shading, since they are greater than or equal to the mandated threshold value and, correspondingly, they fulfil a mandated minimum quality level.

FIGS. 4 to 7 show respective color performance indicators CPI, TPI, LPI, and API for a respective paint under consideration, with their respective associated coefficients "Q". The coefficients "Q" of the respective color performance indicators allow a conclusion to be drawn about the quality of the particular coating under consideration, in relation to the corresponding color performance indicator and/or the performance criterion represented by said indicator. In order to determine a cause of a particularly low value of a coefficient "Q" of a respective color performance indicator, it is possible for measurement data and/or colorimetric deviations of the respective paint under consideration to be shown in compressed form by means of various filter functions.

FIGS. 4 to 7 each show displays which can be selected respectively via a menu bar, the latter being not shown here. For each selectable display, there is a tab available on the menu bar that, by being clicked, automatically calls up the respective display assigned to it, for illustration.

Figure 4:
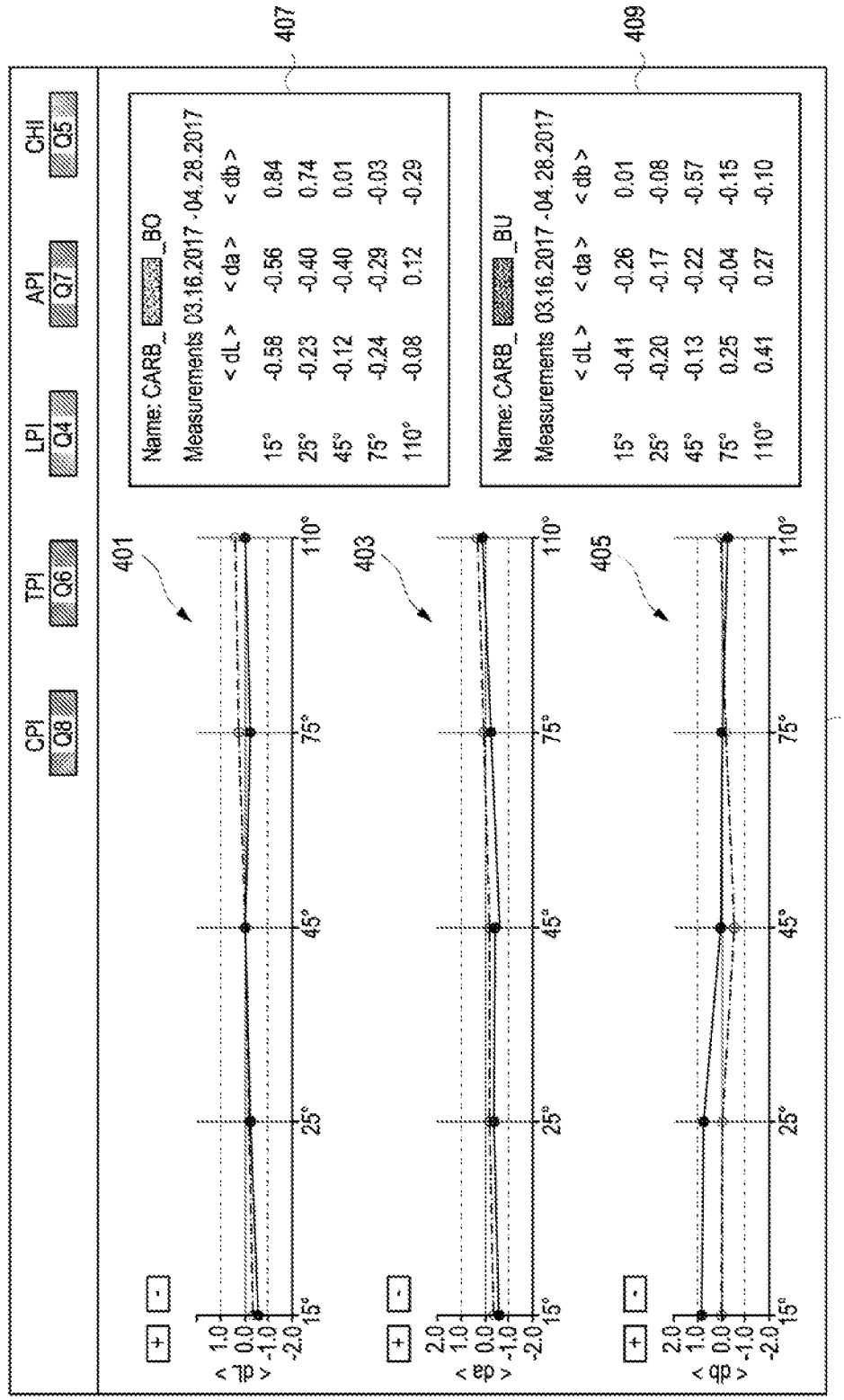
FIG. 4 shows a possible refinement of a third output on an output unit, generated by means of the embodiment of the analytical system of the invention.

Shown in FIG. 4, on selection of an "Average" tab as a mathematical operation of the filter function, on an output screen 400, which is configured as a dashboard and is part of the output unit 107, are three graphs 401, 403 and 405, which each show a profile of measurements of a coating, filtered according to different subunits of an object, in the present case a bumper (dot-dashed line) and a vehicle body (continuous line). The measurements were carried out at different measurement angles or measurement geometries of 15°, 25°, 45°, 75° and 110°, and the resultant color deviations relative to the color reference in the Lab space are represented separately for the individual respective normalized color coordinates or color coordinate differences <dL>, <da> and <db>. These respective color coordinate differences <dL>, <da> and <db> are plotted on the ordinate against the respective measurement angle on the abscissa. Tables 407 and 409 set out in table form the average values represented in the graphs (denoted as CARB, Color Adjustment compared to the Reference Batch) from the measurement values of one batch for a time period, in this case of Mar. 16, 2017-Apr. 28, 2017. The line shown in dot-dash format is based on a coating characterized by the values shown in table 409. The line shown in continuous form is based on a coating characterized by the values shown in table 407. By means of elements "+" and "−" assigned to the respective graphs 401, 403 and 405, it is possible to alter a scaling on which the respective graphs 401, 403 and 405 are based.

By means of the representation of measurement values and/or colorimetric properties of two different subunits, separated according to respective measurement angle, together in one graph it is possible for specific problem areas of a respective subunit, leading to a severe change in the colorimetric properties of a coating, and/or specific problem areas of boundary regions in which the respective subunits border one another, to be recognized quickly and intuitively.

Indicated at the top right in FIG. 4 is a selection of color performance indicators. Whereas CPI with Q8, TPI with Q6 and API with Q7 are noncritical, as identified by dark shading and in practice by green coloration, LPI with Q4 and CHI with Q5 are critical, as identified by light-colored shading, and in practice by yellow or orange coloration.

Figure 5:
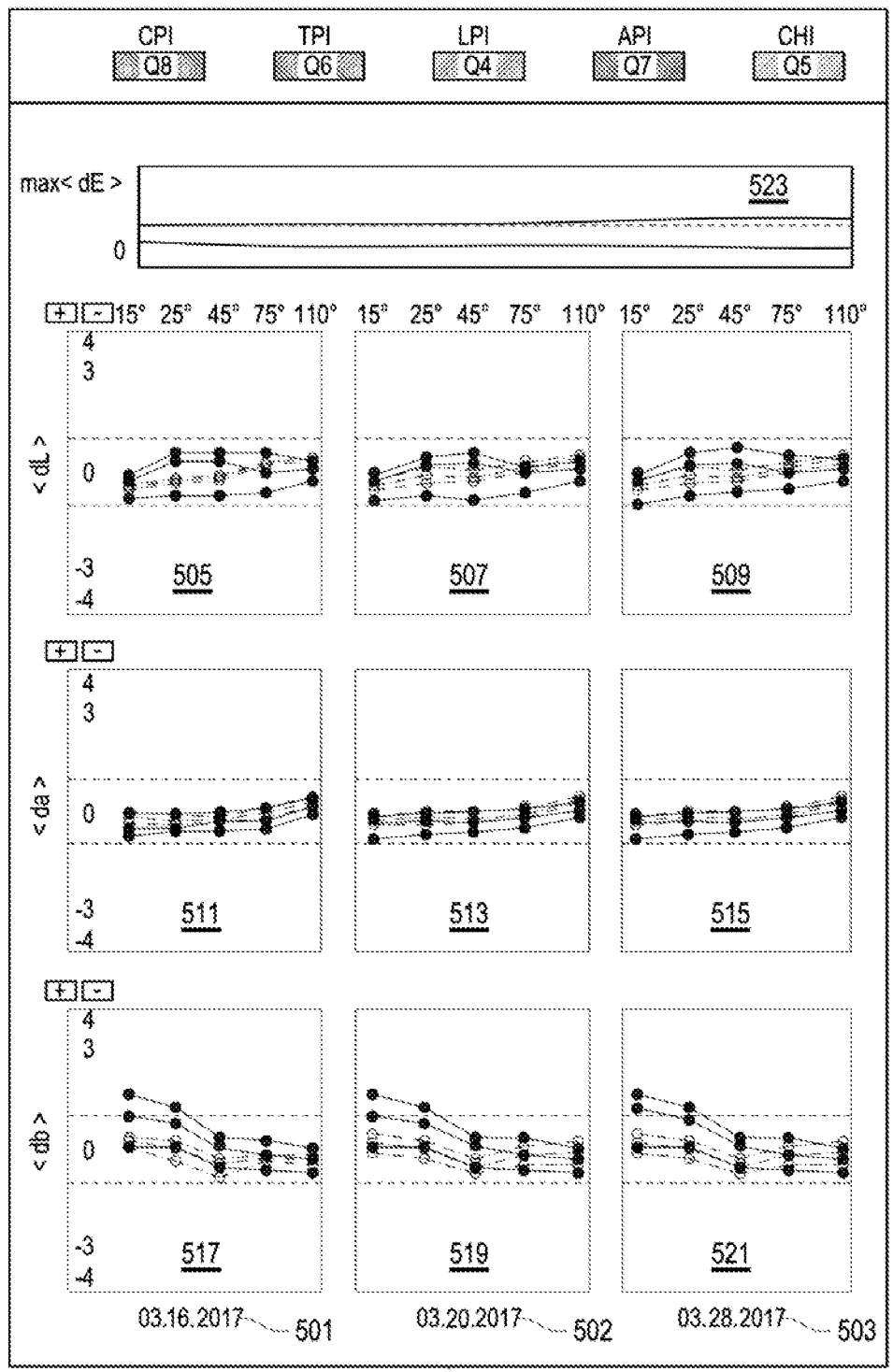
FIG. 5 shows a possible refinement of a fourth output on an output unit, generated by means of the embodiment of the analytical system of the invention.

In contrast to FIG. 4, in which the graphs 401, 403 and 405 depicted are based in each case on average values of measurement values determined within the stated period of time, in FIG. 5, on selection of a "Color Difference" tab, an output screen 500, configured as a dashboard and part of the output unit 107, displays a multiplicity of individual measurement values, and colorimetric deviations determined from them, which have been filtered, by means of a mathematical operation, according to the measurement geometries 15°, 25°, 45°, 75° and 110°, and recorded on different measurement days and/or at different measurement times 501 to 503 within the aforementioned time period. The respective graphs 505, 511 and 517 assigned to the measurement day 501 represent measurement values and/or deviations <dL>, <da>, <db> calculated from them, which are filtered in each case according to a bumper and a body as subunits for a multiplicity of vehicles. In this case graph 505 indicates color differences relative to a color reference in the dimension <dL>, graph 511 indicates color differences relative to the color reference in the dimension <da>, and graph 517 indicates color differences relative to the color reference in the dimension <db>. The deviations <dL>, <da> and <db> identified in each case by the closed circles are assigned to the vehicle body; the deviations <dL>, <da> and <db> identified in each case by the open circles are assigned to the bumper. Plotted in the respective graphs in each case, viewed from left to right, are respective deviations <dL>, <da> and <db> for the measurement angles of 15°, 25°, 45°, 75° and 110°.

The respective graphs 507, 513 and 519 assigned to the measurement day 502 represent measurement values and/or colorimetric deviations, which are filtered in each case according to a bumper and a body as subunits for a multiplicity of vehicles. In this case graph 507 indicates color differences relative to a color reference in the dimension <dL>, graph 513 indicates color differences relative to the color reference in the dimension <da>, and graph 519 indicates color differences relative to the color reference in the dimension <db>.

The respective graphs 509, 515 and 521 assigned to the measurement day 503 represent measurement values and/or colorimetric deviations, which are filtered in each case according to a bumper and a body as subunits for a multiplicity of vehicles. In this case graph 509 indicates color differences relative to the color reference in the dimension <dL>, graph 515 indicates color differences relative to the color reference in the dimension <da>, and graph 521 indicates color differences relative to the color reference in the dimension <db>.

Through a comparison of the graphs of the different measurement days 501 to 503 it is possible quickly and intuitively to capture any change in a quality of a coated finish on the different measurement days.

Graph 523 shows a profile of a maximum average deviation <dE> between the different measurement days, where:

$$<dE>=(<dL>^2+<da>^2+<db>^2)^{1/2}.$$

Indicated at the top right in FIG. 5 is a selection of color performance indicators. While CPI with Q8, TPI with Q6 and API with Q7 are noncritical, as identified by dark shading, and in practice by green coloration, LPI with Q4 and CHI with Q5 are critical, as identified by light-colored shading, in practice by yellow or orange coloration.

Figure 6:
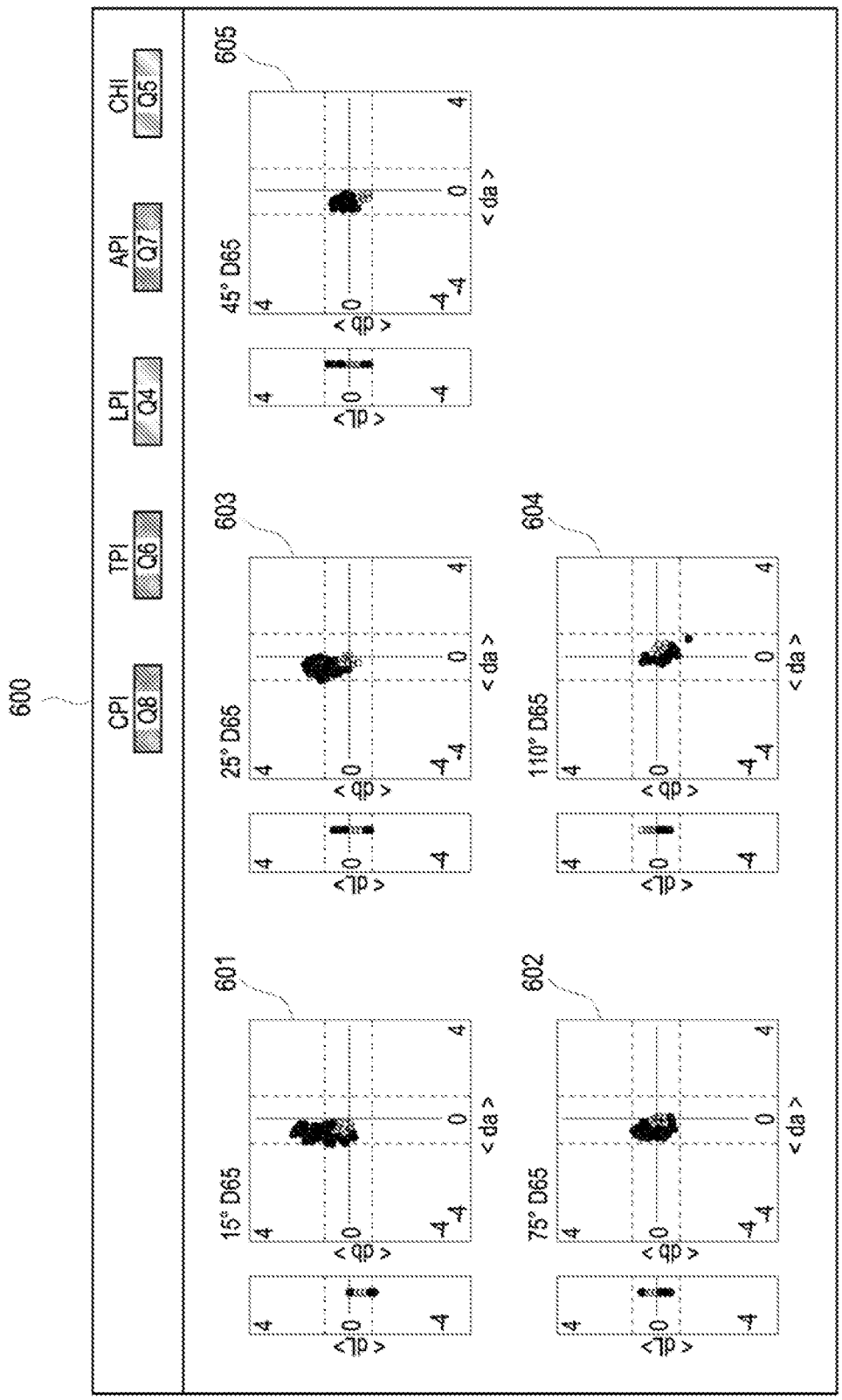
FIG. 6 shows a possible refinement of a fifth output on an output unit, generated by means of the embodiment of the analytical system of the invention.

FIG. 6, on selection of a tab "Color Space" on an output screen 600, which is configured as a dashboard and is part of the output unit 107, shows graphs 601 to 605, which respectively indicate on the right-hand side, in a coordinate system which is generated in each case on the abscissa via a colorimetric deviation "da" and on the ordinate via a colorimetric deviation "db", a color deviation, and on the left-hand side a lightness deviation dL in the Lab space. All of the measurements on which graphs 601 to 605 are based were carried out with a D65 illuminant. The graph 601 shows colorimetric deviations of a coating relative to a color reference, determined at a measurement angle of 15°. The graph 602 shows colorimetric deviations of a coating relative to a color reference, determined at a measurement angle of 25°. The graph 603 shows colorimetric deviations of a coating relative to a color reference, determined at a measurement angle of 45°. The graph 604 shows colorimetric deviations of a coating relative to a color reference, determined at a measurement angle of 75°. The graph 605 shows colorimetric deviations of a coating relative to a color reference, determined at a measurement angle of 110°.

Graphs 601 to 605 show colorimetric differences or deviations of measurement data of a coating relative to a color reference, determined in respect of a bumper and a body; in other words, these colorimetric deviations have been filtered out for the purpose of representation from the multiplicity of colorimetric deviations determined on a vehicle. The light-colored circles/areas here represent the respectively ascertained colorimetric deviations for the bumper, and the dark circles/areas show the respectively ascertained colorimetric deviations for the body. Correspondingly, using the output screen 600, it is possible to capture, quickly and intuitively, any alteration in a colorimetric difference between a respective coating on a respective subunit, i.e., here, bumper or body, and a color reference for different measurement angles under a particular illuminant. Furthermore, here as well there are different color performance indicators indicated at the top right, namely CPI, TPI, LPI, API and CHI, together with their respective values determined for the coating currently applied. While the values of CPI, TPI and API are each above a mandated threshold value, as identified by the dark shading, or in practice by a green coloration, the values of LPI with Q4 and CHI with Q5 are each below the mandated threshold value, as indicated by a light-colored shading, or in practice by a yellow or orange coloration.

As a result of the shading or the coloring of the color performance indicators, a viewer can quickly perceive which color performance indicators are critical for the present coating. Since each of the color performance indicators represents a particular performance criterion, it is also possible to detect rapidly the respect in which the present coating might be critical and what, in association therewith, could possibly be changed with regard to the coating composition and/or the coating conditions. With the coloration of the respective values of the various color performance indicators, a viewer can be given a quick overview. Thus, for example, a green coloration stands for "not critical", an orange or yellow coloration for "critical", and a red coloration for "highly critical". The coloration is dependent on the degree to which the respective value of the respective color performance indicator is below the mandated threshold value; if it is above the threshold, the value is colored green; if it is only a little below, it is colored yellow or orange; if it is far below, it is colored red.

Figure 7:
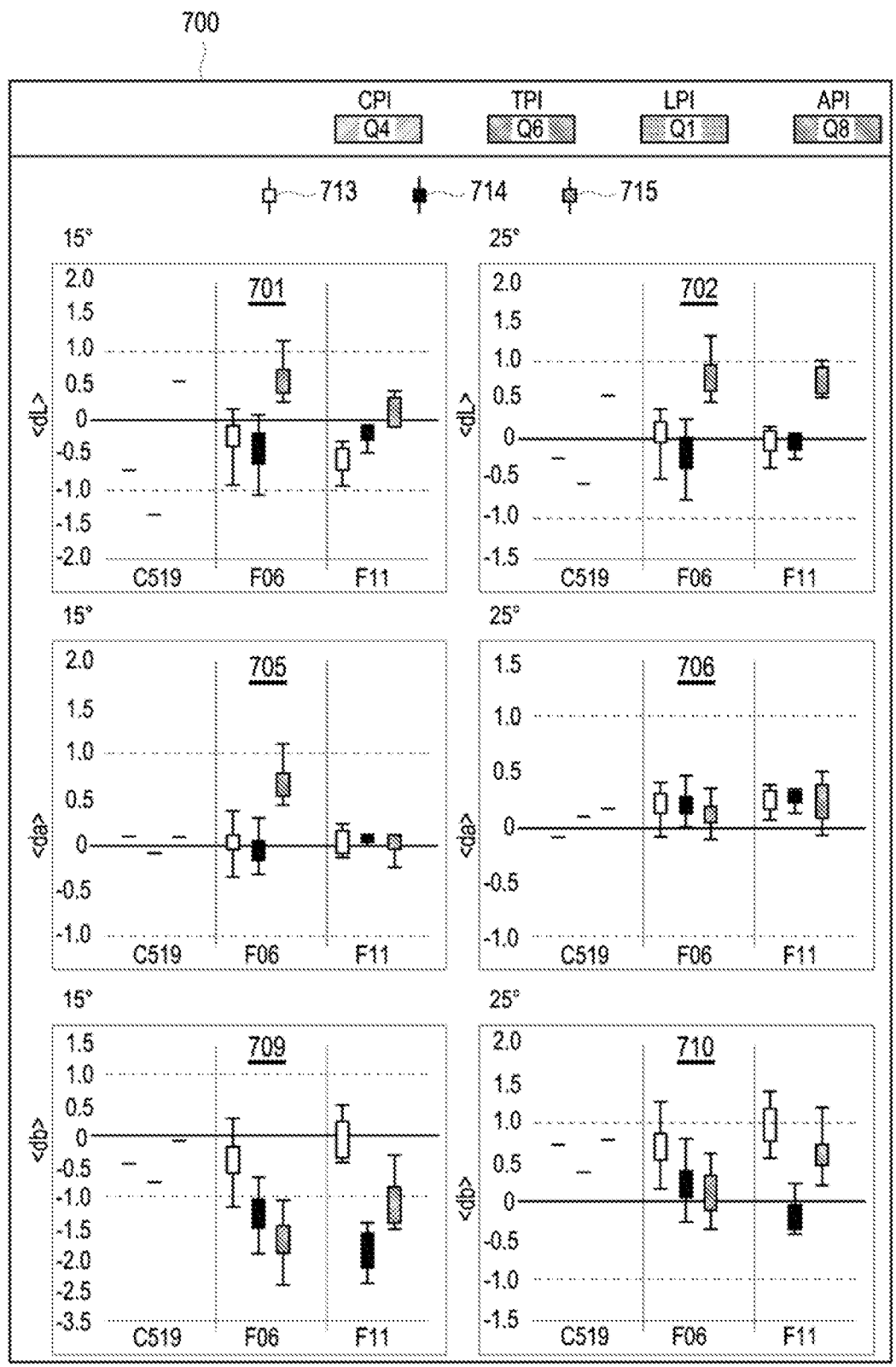
FIG. 7 shows a possible refinement of a sixth output on an output unit, generated by means of the embodiment of the analytical system of the invention.

Shown in FIG. 7 as a result of the selection of a "line performance" tab, on an output screen 700 which is configured as a dashboard and is part of the output unit 107, are graphs 701, 702, 705, 706, 709 and 710.

In the case of graphs 701 and 702, in each case a colorimetric deviation "<dL>" is mapped on the ordinate and different object models or bodywork types are mapped on the abscissa, identified by type codes, "C519", "F06" and "F11".

In the case of graphs 705 and 706, in each case a colorimetric deviation "<da>" is mapped on the ordinate and different object models or bodywork types are mapped on the abscissa, identified by type codes, "C519", "F06" and "F11".

In the case of graphs 709 to 710, in each case a colorimetric deviation "<db>" is mapped on the ordinate and different object models or bodywork types are mapped on the abscissa, identified by type codes, "C519", "F06" and "F11".

Graphs 701, 705 and 709 each represent colorimetric deviations of a coating relative to a color reference, as a mathematical operation of the filter function, which have been determined at a measurement angle of 15°.

Graphs 702, 706 and 710 each represent colorimetric deviations of a coating relative to a color reference, as a mathematical operation of the filter function, which have been determined at a measurement angle of 25°.

Furthermore, the graphs 701, 702, 705, 706, 709 and 710 in each case show colorimetric deviations, determined by the sensor arrangement 103, of a coating relative to a color reference, in the form of so-called "Box plots" as a mathematical operation of the filter function, for each subunit of in this case three subunits 713, 714 and 715.

The box plots indicate respective colorimetric deviations determined for one subunit 713 to 715, together with a variance which represents the operational variability of a corresponding coating procedure. Correspondingly, by means of the box plots in the graphs 701, 702, 705, 706, 709 and 710, it is possible rapidly and intuitively to recognize problems associated with a coating procedure and, where appropriate, correct them. The subunits represented in the present instance are: "door front left" 713, "fender rear left" 714 and "fender front left" 715.

Indicated at the top right in FIG. 7 in turn is a selection of color performance indicators. Whereas TPI with Q6 and API with Q8 are noncritical, as identified by dark shading, in practice by green coloration, CPI with Q4 is critical, as identified by light-colored shading, in practice by yellow or orange coloration, and LPI with Q1 is highly critical, as identified by light-colored cross hatching, in practice by red coloration.

Figure 8:
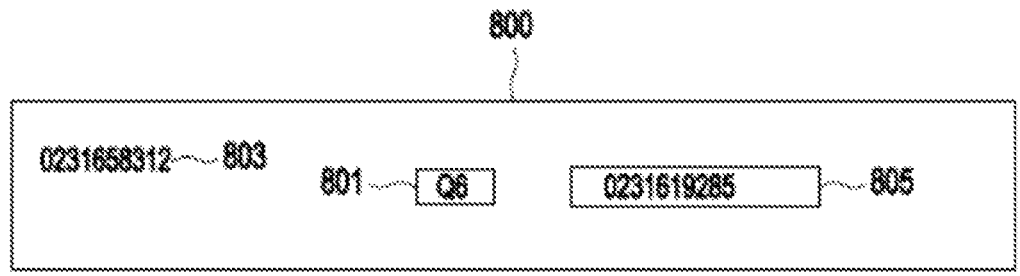
FIG. 8 shows a possible refinement of a seventh output on an output unit, generated by means of the embodiment of the analytical system of the invention.

Represented in FIG. 8 on an output screen 800, which is configured as a dashboard and is part of the output unit 107, is a prediction coefficient 801. The prediction coefficient 801 indicates a performance factor with which a respective coating, represented by a coating number 803, will match with a reference coating, represented by a reference number 805, if it is applied to an object.

The prediction coefficient 801 is determined by the administrative unit 105, by investigating measurement data, determined by the sensor arrangement 103, for colorimetric deviations relative to the color reference. In performing this, the administrative unit 105 takes account of a performance factor of colorimetric deviations between coatings already applied on respective objects and/or subunits, relative to the color reference.

In the case of a new coating batch whose prediction is being calculated, it is assumed that its behavior in respect of respective operational fluctuations is identical and, by means of a new shade setting, only one operational position, i.e. results corresponding to a mean value, without outliers, is changed.

The output screens represented in FIGS. 2 to 9 each show measurement values and/or colorimetric deviations, determined from these values, relative to a color reference, which have been sorted using a respective filter setting or by selection of a respective tab of a menu bar, and represented accordingly.

Figure 9:
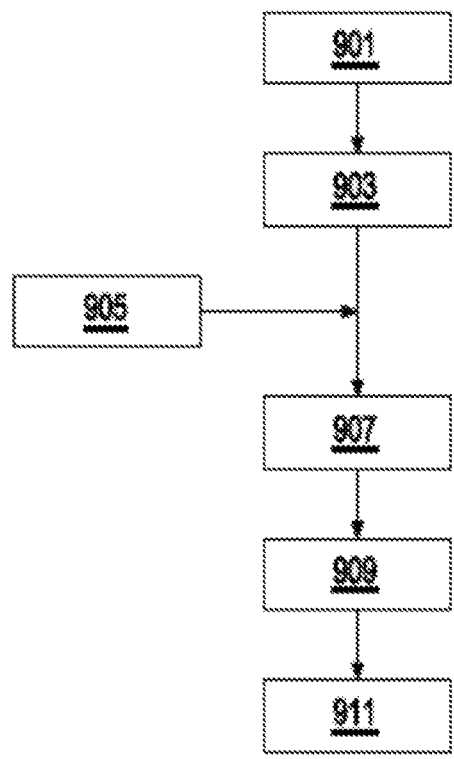
FIG. 9 shows a schematic representation of a possible process of one embodiment of the method of the invention.

Depicted in FIG. 9 is a flow diagram 900 of one possible embodiment of the presented method.

In a first step 901, measurement values of a master panel $X^*_R$ and of a reference batch object coated with a reference coating, or of respective subunits i of the reference batch object $X^*_{line,\ reference\ batch,i}$, are determined as colorimetric coordinates $(L^*,a^*,b^*)_{\phi,\ \sigma,master\ panel}$ and as colorimetric coordinates $(L^*,a^*,b^*)_{\sigma,\phi,i,line.reference\ batch}$.

Here, "$\phi$" stands for a measurement geometry used, "$\sigma$" stands for a light source or illuminant used, and "i" stands for a component or subunit subjected to measurement.

In a second step 903, a deviation of the measurement values of the reference batch object $X^*_{line,reference\ batch,i}$ relative to the master panel or to the color reference $X^*_R$ is determined. Accordingly:

$$dX^*_{line,reference\ batch,i} = (dL^*, da^*, db^*)_{\phi,\sigma,line,reference\ batch}$$

In a third step 905, a deviation factor TM of a coating currently in use is determined on the basis of a current coating status of the coating (in relation to color and/or texture) in relation to a panel coated with the coating of the reference batch, i.e., the reference coating. For this purpose, colorimetric deviations between the coating currently in use and the reference coating are calculated.

In a fourth step 907, a deviation of a coating intended for future use, i.e., a candidate coating, is predicted using the deviations determined in the second step 903 and the deviation factor determined in the third step 905. The following is the case here: (predicted $dX^*$)=$F\_dX_{line,\ reference\ batch,i}$= $(dL^*, da^*, db^*)_{\varphi, o, i, line, reference\ batch}$+(a deviation factor TM determined in step 905).

In a fifth step 909, a tolerance Ss is determined, by being mandated, for example, as a threshold value.

In a sixth step 911, finally, the color indicator CPI of the candidate coating is determined or predicted by means of the following function:

$$CPI\_Forecast = f(<F\_dX_i>_{Ss})_{OEM, ASP}.$$

Here, "OEM" stands for a first subunit, as for example the body, and "ASP" stands for a second subunit, as for example an ancillary component, and "F" is an abbreviation for forecast.

Determined in particular is a deviation between a present coating batch in tint, or a coating batch currently in use for coating on a production line, and a reference batch, this deviation being determined as a color difference. By means of the deviation determined, respective determined measurement values of a coating to be used on a production line are corrected. At least one color performance indicator, such as CPI, for example, is recalculated on the basis of the corrected measurement values, and is output as a coefficient or "predicted color performance indicator" on a display unit.

On the basis of the value of the predicted color performance indicator it is possible to verify whether a change in a composition of the coating to be used compensates the deviation determined and whether, for example, respective color performance indicators of the coating to be used are situated above respective mandated threshold values. As soon as the color performance indicators of the coating to be used lie above the respective mandated threshold values, the corresponding composition of the coating to be used, or of the candidate coating, can be transmitted to a mixing unit for producing an eventual coating.

For example, colorimetric deviation of a coating currently in use may be caused by an incorrectly set spraying robot which, for example, is applying too much coating, so that the applied coating appears darker than a reference coating. In order to correct this deviation caused by the spraying robot, a respective coating to be provided, i.e., a candidate coating, which initially is present only virtually, can be modified by admixing it virtually, for example, with an additional fraction of light-colored pigments. In this case, for example, mandated correction measures for respective deviations can be stored in a memory, and so the candidate coating can be corrected automatically.

By using the predicted color performance indicator, a respective correction can be assessed qualitatively with a mandate, such as a color performance indicator, for example, which has been determined for the reference coating. Correspondingly, the candidate coating can be modified virtually until its predicted color performance indicator lies within a tolerance range of the color performance indicator of the reference coating—in other words, the candidate coating exhibits a mandated quality in terms of a match with the reference coating.

LIST OF REFERENCE NUMBERS

100 analytical system
103 sensor arrangement
105 administrative unit
107 output unit
200 output screen
201 coating symbol
202 coating symbol
203 coating symbol
204 coating symbol
205 coating symbol
206 coating symbol
207 warning
300 output screen
301 coating number
302 coating number
303 time
304 time
305 time
306 time
307 time
308 time
309 time
310 time
311 time
312 time
313 first coefficient
315 second coefficient
317 third coefficient
400 output screen
401 graph
403 graph
405 graph
407 table
409 table
500 output screen
501 measurement datum
502 measurement datum
503 measurement datum
505 graph
507 graph
509 graph
511 graph
513 graph
515 graph
517 graph
519 graph
521 graph
600 output screen
601 graph
602 graph
603 graph
604 graph
605 graph
700 output screen
701 graph
702 graph
705 graph
706 graph
709 graph
710 graph
713 subunit
714 subunit 715 subunit
800 output screen
801 prediction coefficient
803 coating number
805 reference number
900 flow diagram
901 step
903 step
905 step
907 step
909 step
911 step

The invention claimed is:

1. An analytical system (100) for assessing and predicting a performance factor of at least one coating on at least one object with a multiplicity of subunits,
wherein the analytical system comprises:
a sensor arrangement (103) with a multiplicity of sensors,
an administrative unit (105) with at least one processor, and
an output unit (107),
wherein the sensor arrangement is configured to subject the at least one object coated with at least one respective coating to colorimetric measurement by means of the multiplicity of sensors and to provide corresponding colorimetric measurement data to the administrative unit,
wherein the administrative unit is configured, on the basis of the measurement data provided or to be provided by the sensor arrangement, to determine respective colorimetric deviations of the at least one coating relative to a color reference for the multiplicity of subunits of the at least one object and to output these data, sorted by means of at least one filter function, on the output unit in real time, in compressed form, using at least one coefficient (313, 315, 317) assigned to the respective colorimetric deviations of the at least one coating, wherein the administrative unit is configured to select the at least one filter function in dependence on a variable of the at least one coefficient, and with the at least one filter function being designed to represent the measurement data and/or the colorimetric deviations in a form compressed quantitively by means of at least one mathematical operation, and wherein the administrative unit is additionally configured:
a) on the basis of the respective colorimetric deviations of the at least one coating relative to the color reference, for the multiplicity of subunits of the at least one object, to drive a coating unit in such a way that said unit applies a coating to the at least one object, the colorimetric deviations of said coating relative to the color reference for the multiplicity of subunits of the at least one object being minimal and/or lying below a respectively mandated threshold value, and to adjust the coating unit dynamically in dependence on the at least one coefficient, and/or
b) on the basis of the respective colorimetric deviations of the at least one coating relative to the color reference, to drive a mixing unit in such a way that said unit provides a coating whose colorimetric deviations relative to the color reference for the multiplicity of subunits of the at least one object are minimal and/or lie below a respectively mandated threshold value, and to adjust the mixing unit dynamically as a function of the at least one coefficient;

wherein the at least one coefficient is based on a protocol for the quantitative, reproducible measurement of the colorimetric properties of the coating in relation to a performance criterion, and wherein the coefficient condenses factual information and causal relationships about the colorimetric properties of the coating by means of an absolute number.

2. The analytical system as claimed in claim 1, wherein respective sensors of the multiplicity of sensors are divided into a multiplicity of sensor groups, and wherein respective sensor groups are assigned to respective subunits of the at least one object.

3. The analytical system as claimed in claim 1, wherein the administrative unit is configured to output on the output unit a warning message (207) in the event that a respective colorimetric deviation of a respective subunit of the at least one object lies above the respectively mandated threshold value.

4. The analytical system as claimed in claim 1, wherein the administrative unit is configured to represent at least one colorimetric deviation for at least one subunit of the at least one object together with a corresponding measurement variance.

5. The analytical system as claimed in claim 4, wherein the administrative unit is configured to represent the corresponding measurement variance as process variability in at least one box plot.

6. The analytical system as claimed in claim 1, wherein the administrative unit is configured to output respective coordinates of a respective colorimetric deviation in a color space separately from one another on the output unit.

7. A coating determination unit for providing a coating, wherein the coating determination unit comprises:
an administrative unit (203) with at least one processor, and
an output unit (204),
wherein the administrative unit is configured, on the basis of provided colorimetric measurement data of a reference coating, to determine colorimetric deviations of the reference coating on respective subunits of at least one object relative to a color reference, to ascertain colorimetric deviations of a candidate coating relative to the reference coating, as a deviation factor, and to calculate the determined colorimetric deviations of the reference coating relative to the color reference with the deviation factor in order to predict colorimetric deviations of the candidate coating relative to the color reference.

8. The coating determination unit as claimed in claim 7, wherein the administrative unit is configured to modify a formula of the candidate coating to give a final coating until respective colorimetric deviations of the candidate coating or then of the final coating relative to the color reference lie below a mandated threshold value, and to transmit a coating formula of the final coating to a mixing unit for producing the final coating.

9. A method for assessing and predicting a performance factor of at least one coating on at least one object with a multiplicity of subunits, in which, by means of an analytical system (100) as claimed in claim 1, by means of the sensor arrangement (103), the at least one object coated with the at least one coating is subjected to colorimetric measurement and corresponding measurement data are provided to the administrative unit (107), and
wherein, by means of the administrative unit, respective colorimetric deviations, determined by the administrative unit, of the at least one coating relative to a color reference are assigned at least one coefficient (313, 315, 317), using a mandated assignment scheme, and the measurement data and/or the colorimetric deviations are output in compressed form using the at least one coefficient and at least one filter function, wherein the at least one filter function is selected in dependence on a parameter of the at least one coefficient, and wherein the at least one filter function is configured to represent the measurement data and/or the colorimetric deviations in a form compressed quantitatively by means of at least one mathematical operation, and wherein the administrative unit is used:

a) on the basis of the respective colorimetric deviations of the at least one coating relative to the color reference, for the multiplicity of subunits of the at least one object, to drive a coating unit in such a way that said unit applies a coating to the at least one object, the colorimetric deviations of the coating relative to the color reference for the multiplicity of subunits of the at least one object being minimal and/or lying below a respectively mandated threshold value, and to adjust the coating unit dynamically in dependence on the at least one coefficient, and/or b) on the basis of the respective colorimetric deviations of the at least one coating relative to the corresponding color reference, to drive a mixing unit in such a way that said unit provides a coating whose colorimetric deviations relative to the corresponding color reference for the multiplicity of subunits of the at least one object are minimal and/or lie below a respectively mandated threshold value, and to adjust the mixing unit dynamically as a function of the at least one coefficient.

10. A non-transitory computer program product for controlling an analytical system, with a computer program with program code means which, when the computer program is implemented and executed on an arithmetic unit, are designed to perform the method steps as claimed in claim 9.

11. The coating determination unit as claimed in claim 7, wherein the administrative unit is configured, on the basis of provided colorimetric measurement data of a reference coating, to determine colorimetric deviations of the reference coating on respective subunits of at least one object relative to a color reference, to ascertain colorimetric deviations of a candidate coating relative to the reference coating, as a deviation factor, and to calculate the determined colorimetric deviations of the reference coating relative to the color reference with the deviation factor, by summation or multiplication, in order to predict colorimetric deviations of the candidate coating relative to the color reference.

\* \* \* \* \*